(12) United States Patent
Xu et al.

(10) Patent No.: US 11,765,060 B2
(45) Date of Patent: *Sep. 19, 2023

(54) METHODS AND SYSTEMS FOR RESENDING MISSING NETWORK DATA PACKETS

(71) Applicant: NETAPP, INC., San Jose, CA (US)

(72) Inventors: Houze Xu, Lexington, MA (US); Yuepeng Qi, Raleigh, NC (US)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,364

(22) Filed: Nov. 29, 2022

(65) Prior Publication Data

US 2023/0089012 A1 Mar. 23, 2023

Related U.S. Application Data

(63) Continuation of application No. 17/456,471, filed on Nov. 24, 2021, now Pat. No. 11,546,238.

(Continued)

(51) Int. Cl.
*H04L 43/0829* (2022.01)
*H04L 47/50* (2022.01)
(Continued)

(52) U.S. Cl.
CPC ...... *H04L 43/0829* (2013.01); *H04L 43/0847* (2013.01); *H04L 47/365* (2013.01); *H04L 47/54* (2013.01)

(58) Field of Classification Search
CPC ............ H04L 43/0829; H04L 43/0847; H04L 47/365; H04L 47/54
See application file for complete search history.

(56) References Cited

U.S. PATENT DOCUMENTS

| 2006/0146814 | A1* | 7/2006 | Shah | H04L 67/1097 |
| | | | | 370/389 |
| 2014/0369210 | A1* | 12/2014 | Doyle | H04L 47/36 |
| | | | | 370/252 |

(Continued)

OTHER PUBLICATIONS

Recio, et al., "A Remote Direct Memory Access Protocol Specification," Request for Comments: 5040, Retrieved from URL: https://datatracker.ietf.org/doc/html/rfc5040, Oct. 2007, 66 pages.

(Continued)

*Primary Examiner* — Mohamed A. Wasel
*Assistant Examiner* — James Ross Hollister
(74) *Attorney, Agent, or Firm* — LOZA & LOZA, LLP; Tejinder Singh (57) ABSTRACT

Methods and systems for a networked storage environment are provided. One method includes splitting, by a first node, a payload into a plurality of data packets, each data packet having a portion of the payload indicated by an offset value indicating a position of each portion within the payload; transmitting, by the first node, the plurality of data packets to a second node using a network connection for a transaction, each data packet including a header generated by the first node having the offset value and a payload size; receiving, by the first node, a message from the second node indicating an offset value of a missing payload of a missing data packet from among the plurality of data packets; and resending, by the first node, the missing data packet and any other data packet whose offset value occurs after the offset value of the missing payload.

20 Claims, 7 Drawing Sheets

Related U.S. Application Data

(60) Provisional application No. 63/210,404, filed on Jun. 14, 2021.

(51) Int. Cl.
*H04L 47/36* (2022.01)
*H04L 43/0823* (2022.01)

(56) References Cited

U.S. PATENT DOCUMENTS

| | | | |
|---|---|---|---|
| 2015/0026286 A1* | 1/2015 | Sharp | G06F 15/167 |
| | | | 709/212 |
| 2019/0281496 A1* | 9/2019 | Turon | H04L 1/1614 |
| 2020/0322466 A1* | 10/2020 | Yang | H04L 1/1614 |
| 2022/0158772 A1* | 5/2022 | Burstein | G06F 15/17331 |

OTHER PUBLICATIONS

Supplement to InfiniBand™ Architecture Specification "Annex A17: RoCEv2," Sep. 2, 2014, vol. 1, Release 1.2.1; InfiniBand™ Trade Association, 23 pages.

\* cited by examiner

METHODS AND SYSTEMS FOR RESENDING MISSING NETWORK DATA PACKETS

CROSS-REFERENCE TO RELATED APPLICATION(S)

This patent application claims priority under 35 USC § 119 (e) to U.S. Provisional Patent Application Ser. No. 63/210,404, entitled "METHODS AND SYSTEMS FOR RESENDING MISSING NETWORK DATA PACKETS" filed on Jun. 14, 2021, and U.S. patent application Ser. No. 17/456,471 filed on Nov. 24, 2021, the disclosure of both applications is incorporated herein by reference in their entirety.

TECHNICAL FIELD

The present disclosure relates to networked storage systems, and more particularly, to efficiently resending missing packets involving network communication.

BACKGROUND

Various forms of storage systems are used today including direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server", "storage server", "storage node", "storage system node" or "storage controller") executing a storage operating system configured to store and retrieve data on behalf of one or more computing systems at one or more storage devices. The storage operating system exports data stored at storage devices as a storage volume.

To provide redundancy in networked storage systems, a first storage system node and a second storage system node can be configured to operate as partner nodes. This means that all write operations managed by the first storage system node are mirrored at the second storage system node (and vice versa). If the first storage system node fails, then the second storage system node takes over the storage of the failed first storage system node by executing a failover (also referred to as "takeover" throughout this specification) operation.

The RDMA (Remote Direct Memory Access) protocol may be used to transfer data between the first storage system node and the second storage system node. In conventional systems, to send data to the second storage system node (target), the first storage system node, operating as an initiator splits the data payload into multiple data packets. The second storage system node acknowledges a successful data transfer by sending an acknowledgement packet (referred to as an "ACK" packet). If the second storage system node does not receive a specific packet, it sends a "NACK" packet to the first storage system node indicating that the packet was not received. The first storage system node then resends the entire payload. For example, assume that the first storage system node splits a payload into 10 different packets. The second storage system node does not receive packet 5 and sends a NACK. When the first storage system node receives the NACK, it resends all the 10 packets, instead of just sending packets 5-10. This approach of resending all the packets is inefficient because it consumes network bandwidth and computing resources, which is undesirable. Continuous efforts are being made to efficiently resend missing packets in network communication.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

In one aspect, innovative network technology for handling missing network packets is provided. A first storage system node receives a payload to send to a second storage system node. The term node may generically be referred to as a "storage node," "network node", "computing system", "host", "host computing system", "initiator" or "target". The first node splits the payload into multiple data packets, where each data packet has a portion of the payload. The number of data packets for the payload depends on a maximum transmission unit ("MTU") size used by a network interface of the first and second node, respectively, and the overall size of the payload. To transmit the data packets, the first storage node is aware of an offset of each data packet within the payload (i.e., the offset of the portion of the payload of each data packet). As an example, the offset is a starting point in bytes of data that each data packet holds. The packet size is typically equal to the MTU size.

The first node sends the data packets to the second node as part of a transfer operation that is uniquely identified by a transaction identifier. Each data packet transmitted by the first node includes a RDMA header that specifies the total payload size and an offset value. If the second node successfully receives all the packets, then it transmits an ACK packet to the first node to complete the transfer operation.

If the second node does not receive a specific packet, e.g., packet 5 out of a transmission of 10 packets, then the second node transmits a NACK to the first node indicating the offset of the missing data payload of the missing data packet. The first node receives the NACK with the offset and only resends packets from the offset specified in the NACK. For example, if packet 5 is missing, then the first node only sends packets 5-10, rather than transmitting all 10 packets, as performed by conventional networking systems. Because only a portion of the payload is resent, the network bandwidth usage is less vis-à-vis resending the entire payload.

Furthermore, as described below in detail, the technology disclosed herein does not use individual packet numbers or a counter to track if a packet is missing, which can be resource intensive and cause synchronization issues vis-à-vis using offset values to detect missing packets. This saves overall processing resources and provides flexibility for both nodes.

Before, describing the details of the various aspects of the present disclosure, some background information on RDMA technology, also referred to as the "RDMA protocol" may be helpful. For executing RDMA operations, the first node may operate as an initiator and the second node may operate as a target. Using a network interface card, the first node initiates a network connection with the second node that typically accepts the connection. During the connection negotiations, both nodes set a MTU for packet transmission. As an example, the first and second node negotiate the MTU size based on available network link ability, the capability of each node to transmit data packets and process received data packets or any other parameter.

Both the nodes execute a processor executable, RDMA layer to support RDMA operations defined by the RDMA protocol. The RDMA layer enables a RDMA send, RDMA read and RDMA write operation using the RDMA send, RDMA read, and RDMA write primitives that are defined by the RDMA protocol. For example, an RDMA send operation transfers data from a memory buffer at the first node to a memory buffer at the second node. The memory buffer at the second node is not advertised by the second node. An RDMA read operation requests transfer (read) of information from a memory buffer at the second node directly to a memory buffer at the first node. An RDMA write operation transfers data from a memory buffer at the first node directly to a memory buffer at the second node. Unlike the RDMA send operation, the memory buffer at the second node, for the RDMA write operation is advertised by the second node for an RDMA operation.

Both nodes create a protection domain (PD) to associate memory regions with Queue Pairs (QPs). The term QP as used herein includes a structure that maintains a send queue and a receive queue for managing work requests. A PD is typically represented by a unique identifier. The standard use of a PD is described by the RDMA specification. After creating the PD, memory registration is executed to enable direct network interface access to pre-defined memory locations. Both nodes register one or more memory locations (may also be called buffers or memory buffers) with each other so that information can be directly placed to or accessed from the registered memory location. Typically, an operating system of each node registers the memory locations as defined by the RDMA protocol. A registered directly accessible memory location is referred to as a "Memory Region".

During memory registration, a memory key structure is also generated. The memory key structure includes a memory key for authenticating access to a Memory Region. The memory key format/value depends on the type of network protocol, e.g., InfiniBand ("IB"), iWARP (Internet Wide Area RDMA Protocol), RoCE (RDMA over Converged Ethernet), RoCEv2 or any other protocol that is used in conjunction with the RDMA protocol.

IB is typically used to create fabrics with interconnected hosts/switches/servers. The IB Specification is published by the InfiniBand Trade Association ("IBTA") and provides support for RDMA operations.

iWARP is defined by the Internet Engineering Task Force (IETF). iWARP includes a collection of protocols for enabling RDMA based operations over TCP (Transmission Control Protocol) networks. These protocols are MPA (Marker Protocol Data Unit Aligned Framing for TCP), Direct Data Placement (DDP), and the RDMA protocol. The DDP protocol allows data to be placed directly into assigned memory buffers using network protocols, for example, TCP/IP (Internet Protocol) and others.

RoCE is a network protocol that enables RDMA over an Ethernet network. This is enabled by encapsulating an IB transport packet over an Ethernet packet. There are two RoCE versions, RoCE v1 and RoCE v2. RoCE v1 is an Ethernet link layer protocol and hence allows communication between any two nodes in the same Ethernet broadcast domain. RoCE v2 is an Internet layer protocol which means that RoCE v2 packets can be routed.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

Figure 1A:
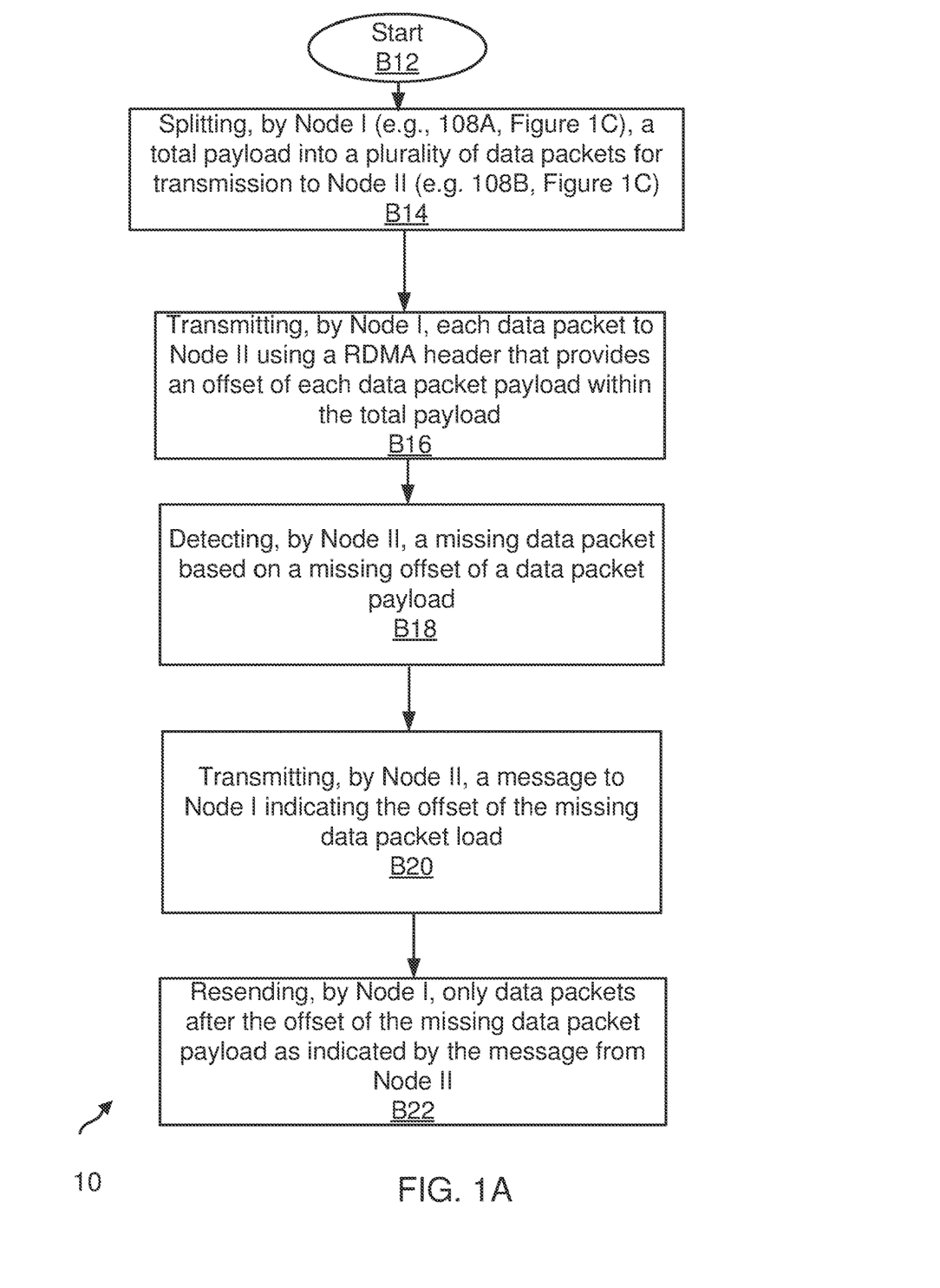
FIG. 1A shows a process flow for resending missing packets during a network transmission, according to one aspect of the present disclosure.

Process Flow: FIG. 1A shows a process 10 for handling missing data packets during a network transmission, according to one aspect of the present disclosure. Process 10 is described with respect to network communication between storage nodes 108A and 108B of FIG. 1C, described below in detail, however, the same process can be used for communication between a client system and a storage server or a host server and a storage server of FIG. 1B, also described below in detail.

Figure 1B:
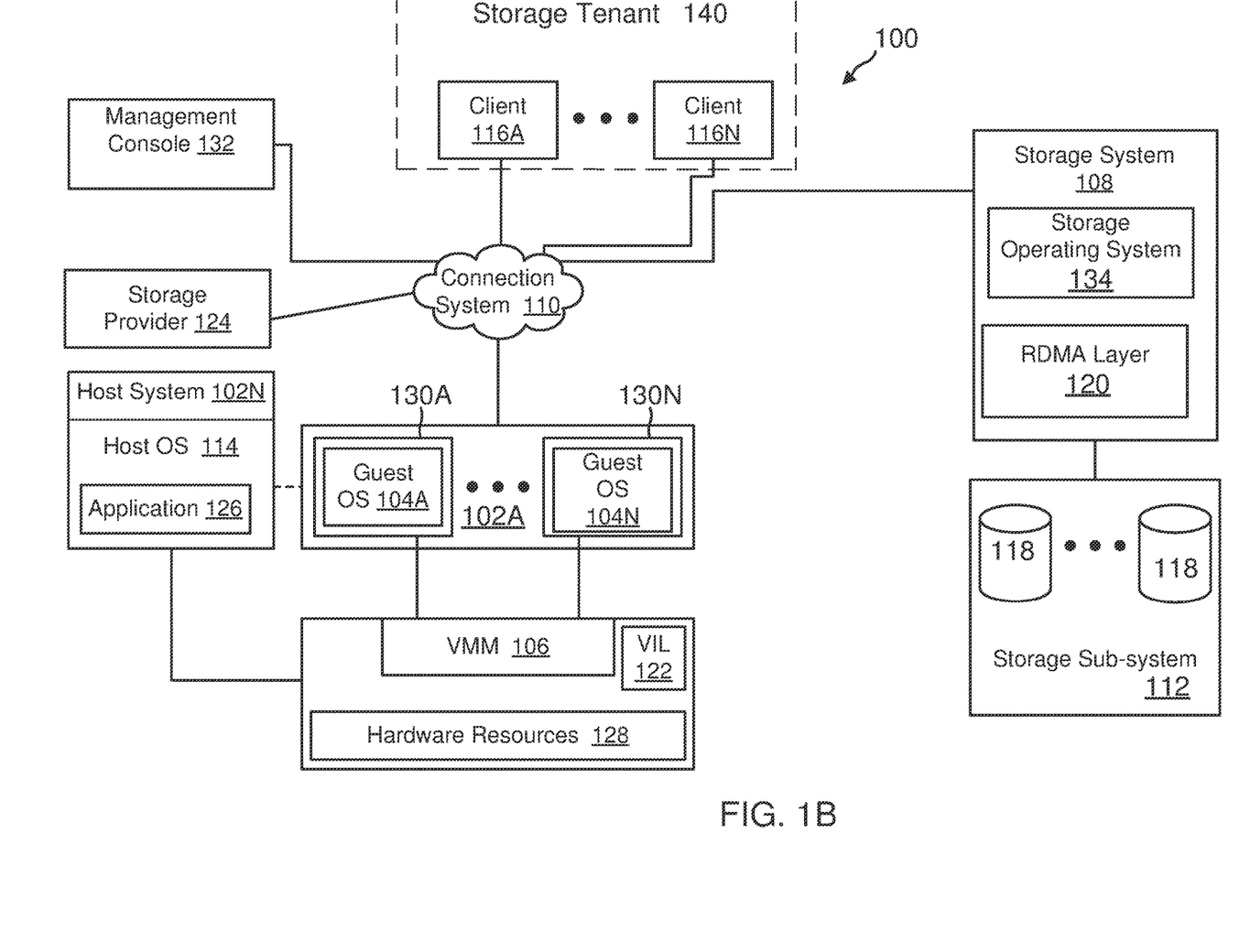
FIG. 1B shows an example of an overall operating environment for various aspects of the present disclosure.
Figure 1C:
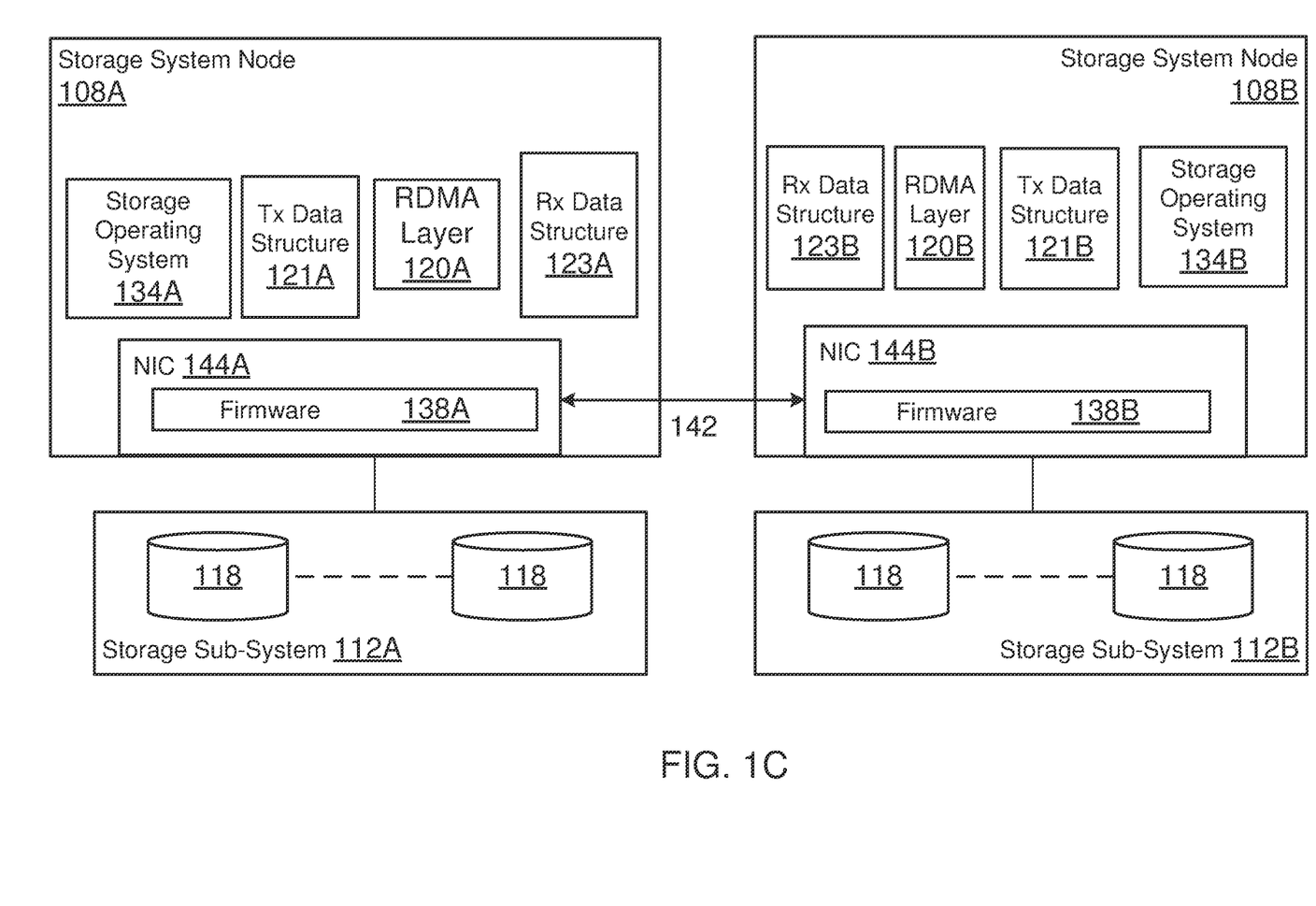
FIG. 1C shows an example of two storage system nodes operating as partner nodes, according to one aspect of the present disclosure.

Process 10 begins in block B12, after a network connection between storage nodes 108A/108B has been established using network interface cards ("NICs") 144A-144B (FIG. 1C) and an MTU size has been negotiated by the storage nodes 108A and 108B. Memory Region for an RDMA operation is also registered with a QP to establish a PD. The storage operating system 134 or any other application defines a payload that needs to be sent via a network link, e.g., 142 (FIG. 1C).

In block B14, a RDMA layer 120A (FIG. 1C) of storage node 108A splits the total payload into data packets such that each packet has a portion of the total payload (referred to as data packet payload). The position of the data packet payload within the total payload is defined by an offset value, e.g., in bytes. The number of data packets will depend on the overall size of the payload and the negotiated MTU between NICs 144A and 144B. The RDMA layer 120A identifies each data packet and assigns the offset for each data packet payload. The offset, the data packet size and the total payload size are included in a RDMA header that is created by the RDMA layer 120A. As an example, each data packet includes the following in addition to a portion of the payload: Ethernet header, IPv4 header (Internet Protocol, Version 4), a UDP (User Datagram protocol) header and a RDMA header. The RDMA header format is specified by the RDMA specification and may include a plurality of fields indicating a protocol, a version, packet type (e.g., Control packet, Data packet, or ACK/NACK packet), a request sequence number, a request length, an offset value in the request, a packet length (i.e. packet size), a destination address and other vendor specific info.

In block B16, the storage node 108A using NIC 144A and network link 142 transmits data packets for the total payload. The transmission is associated with a transaction identifier. The network link 142 can be an Ethernet link or any other link type. The data packets can be sent using TCP/IP, UDP or any other protocol. As an example, the storage node 108A maintains a transmit ("Tx") data structure 121A (FIG. 1C) that includes the transaction identifier, total payload size, and offset value of each data packet within the total payload. Table I below shows an example of the Tx data structure 121A, where the transaction identifier is shown as T1, the total payload size for the transaction is X bytes and the offset value of each packet is shown as B0-Bn.

TABLE I

| Transaction ID ("Tx_ID") | Total Payload Size | Offset Value of Each Data Packet | Other Fields |
|---|---|---|---|
| T1 | X Bytes | B0 | F1 |
| T1 | X Bytes | B1 | F2 |
| T1 | — | — | — |
| T1 | X Bytes | Bn | Fn |

In block B18, the storage node 108B receives the data packets from the storage node 108A at NIC 144B. In one aspect, the RDMA layer 120B tracks the offset of each incoming packet to detect a gap in an expected offset of the received data packets. As an example, the RDMA layer 120B may use a receive ("Rx") data structure 123B, described below in detail, to track the progress of received data packets associated with the transaction identifier. The Rx data structure 123B stores the transaction identifier and offset value of the received data packets. The RDMA layer 120B detects a missing packet in the data transfer because it is aware of the total payload size, the size and offset of each data packet. If the gap in the expected offset is detected, indicating a missing data packet payload, the RDMA layer 120B concludes that a data packet is missing. Table II below shows an example of detecting the missing packet. Assume that the first received packet has the offset value of B0. The RDMA layer 120B expects the next offset value to be B1, but instead receives a packet with the offset B2. The RDMA layer 120B then concludes that the data packet with the offset value B1 is missing.

TABLE II

| Transaction ID ("Tx_ID") | Total Payload Size | Offset Value of Received Packet | Other fields |
|---|---|---|---|
| T1 | X Bytes | B0 | F0 |
| T1 | X Bytes | B1 | F1 |
| T1 | X Bytes | B2 | F2 |
| T1 | X Bytes | — | — |
| T1 | X Bytes | BN | Fn |

In response to detecting the missing data packet payload, in block B20, the storage node 108B sends a NACK packet to the storage node 108A. The NACK packet indicates the missing offset of the missing data packet payload. Continuing with the foregoing example, when the packet with offset B1 is missing, the NACK packet will include the offset B1.

In block B22, the storage node 108A determines that a data packet payload was missing based on the offset included in the NACK packet. The storage node 108A uses the Tx data structure 121A to rebuild the data packets from the missing offset to ensure that all packets after the missing packet are re-sent. The rebuild data packets from the missing offset are sent to the storage node 108B via NIC 144A. Continuing with the above example, the storage node 108A checks the Tx data structure 121A to determine that the packet with offset B1 is missing. The RDMA layer 120A then rebuilds data packets using offset values from B1 to Bn, the data packet with offset value of B0.

Unlike conventional systems, process 10 does not resend the total payload. This saves network bandwidth and processor usage of the storage nodes. Furthermore, because the storage node 108B detects a missing packet based on an offset value, it does not have to use packet identifiers or counters to count packets, which saves processing resources of storage node 108B and simplifies the overall detection of a missing data payload packet. Furthermore, there are other advantages of using process 10 including reduced management overhead and simplified receive buffer operation; resolving any window sizing problem by using NACK packets; and a receive buffer for holding data packets can be sufficiently large and hence, complicated window-size tuning is not needed. The receive buffer in this context means memory used by the storage nodes to temporarily hold received data packets. Window size tuning is used in network communication, e.g., using the TCP protocol, where a receive window size is the amount of receive data (in bytes) that can be buffered during a network connection. The sending node sends an amount of data based on the window size, before it must wait for an acknowledgment and window update from the receiving host. The window size is tuned based on the sent and received data. This is avoided by using process 10 described above.

In one aspect, methods and systems for a networked storage environment are provided. One method includes splitting (e.g., B14, FIG. 1A), by a first node (e.g., 108A, FIG. 1C)), a payload into a plurality of data packets, each data packet having a portion of the payload indicated by an offset value indicating a position of each portion within the payload; transmitting (e.g., B16, FIG. 1A), by the first node, the plurality of data packets to a second node (e.g., 108B, FIG. 1C) using a network connection for a transaction, each data packet including a header generated by the first node having the offset value and a payload size; receiving (e.g., B20, FIG. 1A), by the first node, a message from the second node indicating an offset value of a missing payload of a missing data packet from among the plurality of data packets; and resending (e.g., B22, FIG. 1A), by the first node, the missing data packet and any other data packet whose offset value occurs after the offset value of the missing payload.

In another aspect, a non-transitory, machine-readable storage medium having stored thereon instructions for performing a method is provided. The machine-readable storage medium comprising machine executable code which when executed by at least one machine, causes the machine to: transmit, by a first node, a plurality of data packets to a second node for a transaction via a network connection, each data packet having a portion of a payload and a header with an offset value and a payload size, the offset value indicating each portion's position within the payload; detect, by the second node, a missing data packet from among the plurality of data packets of the transaction, based on offset values of a portion of the plurality of data packets received from the first node; transmit, by the second node, a message to the first node indicating an offset value of a missing payload of the missing data packet; and selectively rebuild, by the first node, data packets for retransmission to the first node, the rebuilt data packet including the missing data packet and any other data packet having an offset value that occurs after the offset value of the missing payload.

System 100: FIG. 1B shows an example of a networked storage environment 100 (also referred to as system 100), for implementing the various adaptive aspect of the present disclosure. System 100 may include a plurality of computing devices 102A-102N (may also be referred to as a "host system 102," "host systems 102", "computing device 102", "computing devices 102", "server 102" or "servers 102") communicably coupled via a connection system 110 (e.g., a local area network (LAN), wide area network (WAN), the Internet and others) to a storage system 108 (may also be referred to as "storage server 108", "storage controller 108", "storage node 108", "storage nodes 108", "storage system node 108" or "storage system nodes 108") that executes a storage operating system 134 for storing and retrieving data to and from a storage subsystem 112 having mass storage devices 118. Although only a single storage system 108 is shown in FIG. 1B, according to aspects of the present disclosure, system 100 includes a plurality of storage systems 108 arranged in one or more high-availability pairs (FIG. 1C). The storage system 108 also executes a RDMA layer 120 for executing RDMA operations, described above in detail. As used herein, the term "communicably coupled" may refer to a direct connection, a network connection, or other connections to enable communication between devices.

As an example, host system 102A may execute a plurality of virtual machines (VMs) in a virtual environment that is described below in detail. Host 102N may execute one or more application 126, for example, a database application, an email application, or any other application type that uses the storage system 108 to store information in storage devices 118. Host 102N executes an operating system 114, for example, a Windows based operating system, Linux, Unix and others (without any derogation of any third-party trademark rights) to control the overall operations of host 102N.

Clients 116A-116N are computing devices that can access storage space at the storage system 108 via the connection system 110. A client can be the entire system of a company, a department, a project unit or any other entity. Each client is uniquely identified and, optionally, may be a part of a logical structure called a storage tenant 140. The storage tenant 140 represents a set of users (may be referred to as storage consumers) for a storage provider 124 (may also be referred to as a cloud manager, where cloud computing is utilized) that provides access to storage system 108. It is noteworthy that the adaptive aspects of the present disclosure are not limited to using a storage provider or a storage tenant, and instead, may be implemented for direct client access.

In one aspect, the storage operating system 134 has access to mass storage devices 118 of storage subsystem 112. The mass storage devices 118 may include solid state drives (SSDs), storage class memory, writable storage device media such as hard disk drives (HDD), magnetic disks, video tape, optical, DVD, magnetic tape, and/or any other similar media adapted to store electronic information. The storage devices 118 may be organized as one or more groups of Redundant Array of Independent (or Inexpensive) Disks (RAID). The various aspects disclosed are not limited to any specific storage device type or storage device configuration.

As an example, the storage operating system 134 may provide a set of logical storage volumes (or logical unit numbers (LUNs)) that present storage space to host systems 102, clients 116, and/or VMs (e.g., 130A/130N, described below) for storing information. Each volume may be configured to store data containers (e.g., files, directories, structured or unstructured data, or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space.

An example of storage operating system 134 is the Data ONTAP® storage operating system available from NetApp, Inc. that implements a Write Anywhere File Layout (WAFL®) file system (without derogation of any trademark rights of NetApp Inc.) or the CLOUD ONTAP® for executing the storage operating system 134 in the cloud. The various aspects disclosed herein are not limited to any specific file system type and maybe implemented by other file systems and storage operating systems.

The storage operating system 134 organizes storage space at the storage subsystem 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 118. A request to store or read data may be based on file-based access protocols, for example, the Common Internet File System (CIFS) protocol or Network File System (NFS) protocol, over TCP/IP. Alternatively, the request may use block-based access protocols, for example, iSCSI (Internet Small Computer Systems Interface) and SCSI encapsulated over Fibre Channel (FCP). The term file/files as used herein include data container/data containers, directory/directories, and/or data object/data objects with structured or unstructured data.

Figure 2A:
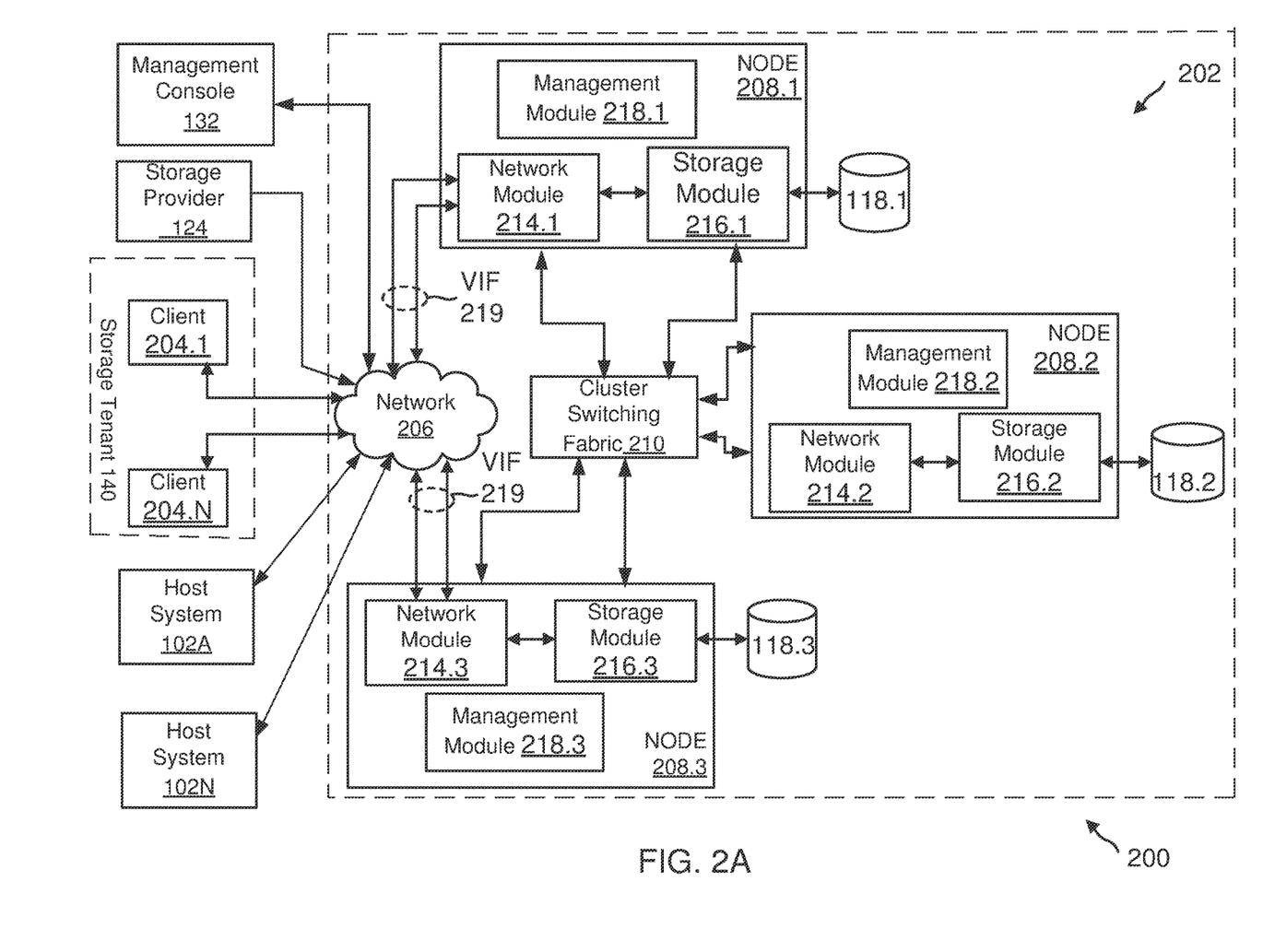
FIG. 2A shows an example of a clustered storage system with a plurality of storage system nodes, used according to various aspects of the present disclosure.
Figure 2B:
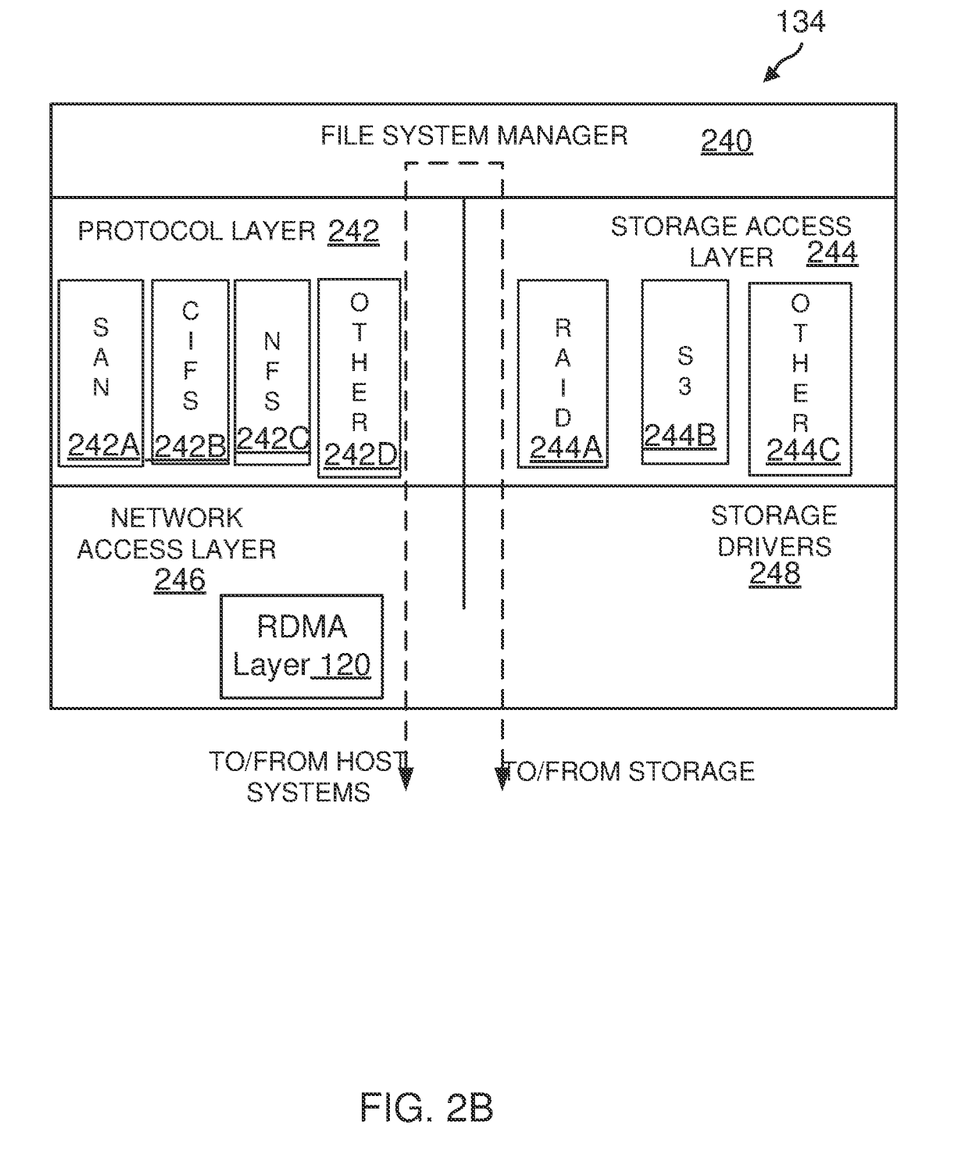
FIG. 2B shows an example of a storage operating system executed by a storage system node, according to various aspects of the present disclosure.

To facilitate access to storage space, the storage operating system 134 implements a file system (also referred to as file system manager e.g., the file system manager 240, shown in FIG. 2B) that logically organizes stored information as a hierarchical structure for files/directories/objects at the storage devices. The storage operating system 134 may further implement a storage module (for example, a RAID system for the storage subsystem 112) that manages the storage and retrieval of the information to and from storage devices 118 in accordance with input/output (I/O) operations.

In a typical mode of operation, a computing device (e.g., host system 102, client 116 or any other device) transmits one or more I/O requests over connection system 110 to the storage system 108. Storage system 108 receives the I/O requests, issues one or more I/O commands to storage devices 118 to read or write data on behalf of the computing device, and issues a response containing the requested data over the network 110 to the respective client system.

As mentioned above, system 100 may also include a virtual machine environment where a physical resource is time-shared among a plurality of independently operating processor executable virtual machines (VMs). Each VM may function as a self-contained platform, running its own operating system (OS) and computer executable application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system) which may be referred to herein as "host hardware resources". The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1B, host system 102A includes/provides a virtual machine environment executing a plurality of VMs 130A-130N (also referred to as VM 130 or VMs 130) that may be presented to client computing devices/systems 116A-116N. VMs 130 execute a plurality of guest OS 104A-104N (may also be referred to as guest OS 104) that share hardware resources 128. Application 126 may also be executed within VMs 130 to access the storage system 108. As described above, hardware resources 128 may include storage, CPU, memory, I/O devices, or any other hardware resource.

In one aspect, host system 102A interfaces with or includes a virtual machine monitor (VMM) 106, for example, a processor executed Hyper-V layer provided by Microsoft Corporation of Redmond, Wash., a hypervisor layer provided by VMWare Inc., or any other type (without derogation of any third-party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 may be executed by an independent stand-alone computing system, referred to as a hypervisor server or VMM server and VMs 130 are presented at one or more computing systems.

It is noteworthy that different vendors provide different virtualization environments, for example, VMware Corporation, Microsoft Corporation, and others. Data centers may have hybrid virtualization environments/technologies, for example, Hyper-V and hypervisor based virtual environments. The generic virtualization environment described above with respect to FIG. 1B may be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 may be implemented as or include one or more application programming interfaces (APIs) that are used for managing one or more components of system 100. The APIs may be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e., a non-cluster-based system, in another aspect, storage system 108 may have a distributed architecture; for example, a cluster-based storage system that is described below in detail with respect to FIG. 2A.

FIG. 1C shows an example of storage system nodes 108A/108B connected by a link 142 (e.g., a communication link or any other interconnect type) configured to operate as partner nodes and execute RDMA operations described above with respect to FIG. 1A. This means that any data written by one storage system node (e.g., 108A) can be mirrored at the partner storage system node (e.g., 108B) using a RDMA operation. If one storage system node fails (e.g., 108A), then the other partner storage system node (e.g., 108B) takes over the storage volumes/LUNs of the failed storage system node during a failover operation that is also referred to as a "takeover operation".

Each storage system node 108A/108B executes the storage operating system 134 (shown as 134A for the storage system node 108A, and 134B for the storage system node 108B). To protect against failures, each storage system node persistently stores a log, referred to as "NVLog", to track each write operation that is being processed by the buffer cache of each storage system node at any given time. During a failover operation, the storage volumes of a failed storage system node (e.g., 108A) are made available to incoming read and write requests, a partner storage system node (e.g., 108B).

In one aspect, storage node 108A includes a NIC 144A that executes firmware instructions 138A to receive data and instructions from the RDMA layer 120A to transfer data packets to the storage node 108B, as described above with respect to FIG. 1A. The storage node 108B includes NIC 144B and executes the RDMA layer 120B to receive data packets from NIC 144A as well to send data packets to NIC 144B. The storage node 108A maintains the Tx data structure 121A at a memory location. The Tx data structure 121A stores a transaction identifier identifying a data transfer between the storage node 108A and the storage node 108B. The TX data structure may also include an overall payload size and an offset value indicating the offset of each data packet within the overall payload, as described above with respect to Table I.

The storage node 108B maintains the Rx data structure 123B that stores a transaction identifier and an offset value of each received data packet. The Rx data structure 123B enables the storage node 108B to detect a missing packet, as described above with respect to Table II. The storage node 108B also maintains a Tx data structure 121B, similar to 121A for data packets that are transmitted by the storage node 108B to the storage node 108A. The storage node 108A further maintains a Rx data structure 123A, similar to 123B to detect any missing data packets by tracking offset values of received data packets from the storage node 108B.

Clustered Storage System: FIG. 2A shows a cluster-based storage environment 200 having a plurality of storage system nodes operating to store data on behalf of clients at storage subsystem 112. The various storage system nodes may be configured to operate as partner nodes, described above with respect to FIG. 1C. Any data packets that are missing during network communication are processed using the process flow of FIG. 1A.

Storage environment 200 may include a plurality of client systems 204.1-204.N (may also be referred to as "client system 204" or "client systems 204") as part of or associated with storage tenant 140, a clustered storage system 202 (similar to storage system 108) and at least a network 206 communicably connecting the host system 102A-102N, client systems 204.1-204.N, the management console 132, the storage (or cloud) provider 124 and the clustered storage system 202. It is noteworthy that these components may interface with each other using more than one network having more than one network device.

The clustered storage system 202 includes a plurality of storage system nodes 208.1-208.3 (also referred to as "node 208" or "nodes 208"), a cluster switching fabric 210, and a plurality of mass storage devices 118.1-118.3 (similar to 118, FIG. 1C). The nodes 208.1-208.3 can be configured as high-availability pair nodes to operate as partner nodes, as shown in FIG. 1C. For example, nodes 208.1 and 208.2 may operate as partner nodes. If node 208.1 fails, node 208.2 takes over the storage volumes that are exposed by node 208.1 during a failover operation.

Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the host systems 102A-102N, and the client systems 204.1-204.N (or the management console 132) over the computer network 206. The network modules 214.1-214.3 handle file network protocol processing (for example, CFS, NFS and/or iSCSI requests). The storage modules 216.1-216.3 connect to one or more of the storage devices and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices, such as storage devices 118.1-118.3.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs")), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs 219 and storage associated with one or more SVMs. Client systems can access the data on a SVM from any node of the clustered system, through the VIF(s) 219 associated with that SVM.

Each of the nodes 208.1-208.3 is defined as a computing system to provide services to one or more of the client systems 204.1-204.N and host systems 102A-102N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Storage Operating System: FIG. 2B illustrates a generic example of the storage operating system 134 of FIG. 1C executed by the storage system node 108 (or nodes 208.1-208.3, FIG. 2A), according to one aspect of the present disclosure. In one example, storage operating system 134 may include several modules, or "layers" executed by one or both of network module 214 and storage module 216. These layers include the file system manager 240 that keeps track of a hierarchical structure of the data stored in storage devices 118 and manages read/write operation, i.e., executes read/write operation on storage in response to I/O requests.

Storage operating system 134 may also include a protocol layer 242 and an associated network access layer 246, to allow node 208.1 to communicate over a network with other systems, such as clients 204.1/204.N. Protocol layer 242 may implement one or more of various higher-level network protocols, such as SAN (e.g., iSCSI) (242A), CIFS (242B), NFS (242C), Hypertext Transfer Protocol (HTTP) (not shown), TCP/IP (not shown) and others (242D).

Network access layer 246 may include one or more drivers, which implement one or more lower-level protocols to communicate over the network, such as Ethernet. Interactions between host systems and mass storage devices are illustrated schematically as a path, which illustrates the flow of data through storage operating system 134. In one aspect, the RDMA layer 120 is executed within the network access layer 246.

The storage operating system 134 may also include a storage access layer 244 and an associated storage driver layer 248 to allow storage module 216 to communicate with a storage device. The storage access layer 244 may implement a higher-level storage protocol, such as RAID (244A), a S3 layer 244B to access a capacity tier for object-based storage (not shown), and other layers 244C. The storage driver layer 248 may implement a lower-level storage device access protocol, such as Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure may be utilized with any suitable file system, including a write in place file system.

Figure 3:
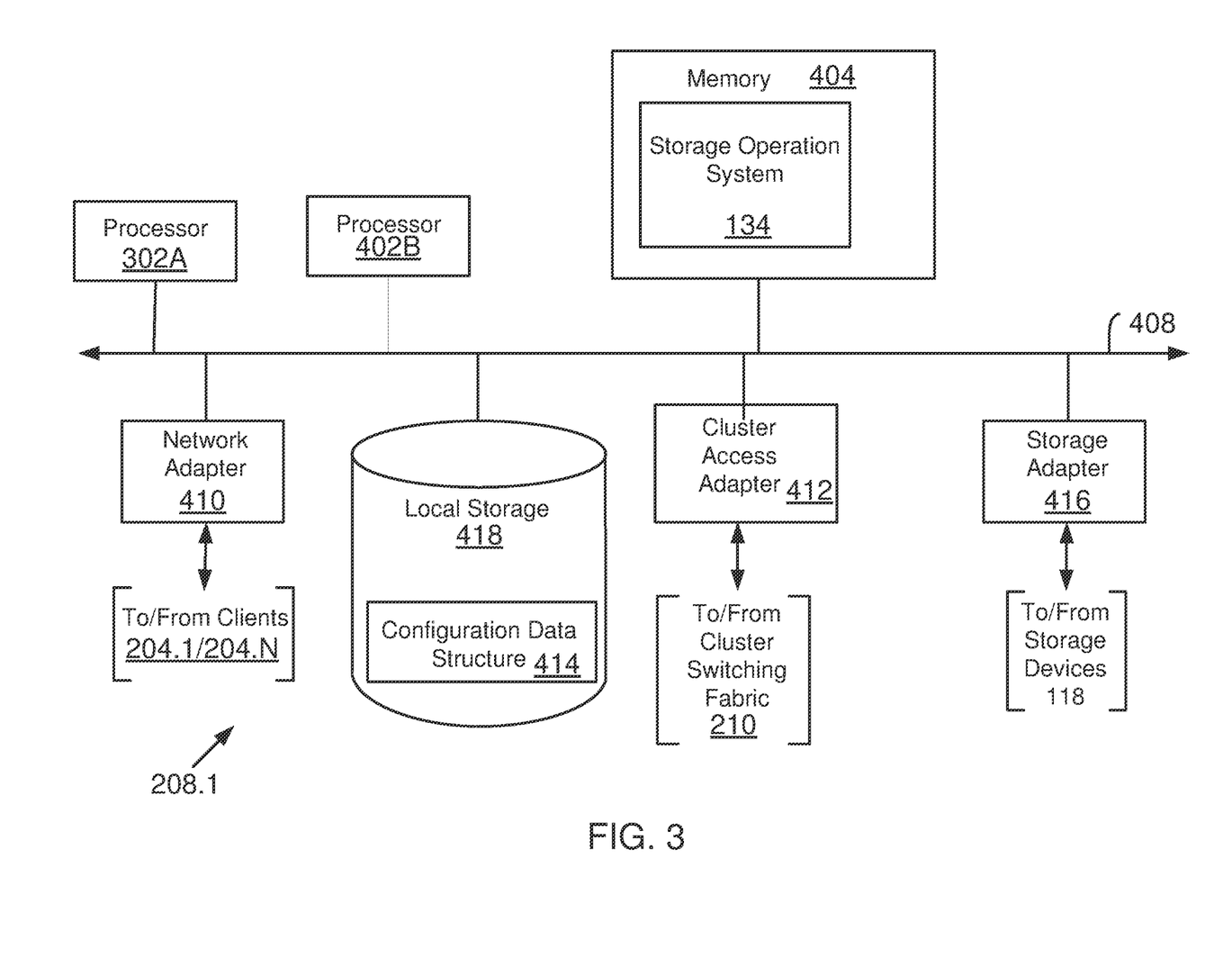
FIG. 3 shows an example of a storage system node, according to various aspects of the present disclosure.

Storage System Node: FIG. 3 is a block diagram of a node 208.1, (including the storage system nodes 108A/108B) that is illustratively embodied as a storage system comprising of a plurality of processors 402A and 402B, a memory 404, a network adapter 410, a cluster access adapter 412, a storage adapter 416 and local storage 418 interconnected by a system bus 408.

Processors 402A-402B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 418 comprises one or more storage devices utilized by the node to locally store configuration information for example, in a configuration data structure 414.

The cluster access adapter 412 comprises a plurality of ports adapted to couple node 208.1 to other nodes of cluster 202 (FIG. 2A). In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 412 is utilized by the network/storage module for communicating with other network/storage-modules in the cluster 202.

Each node 208.1 is illustratively embodied as a dual processor storage system executing the RDMA layer 120 and storage operating system 134 that preferably implements a high-level module, such as a file system 240, to logically organize the information as a hierarchical structure of named directories and files at storage 118. However, it will be apparent to those of ordinary skill in the art that the node 208.1 may alternatively comprise a single or more than two processor systems. Illustratively, one processor 402A executes the functions of the network module on the node, while the other processor 402B executes the functions of the storage module.

The memory 404 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

In one aspect, data that needs to be written is first stored at a buffer cache in memory 404. The written data is then stored persistently at storage devices 118 during a consistency point operation.

The network adapter 410 (similar to 144A/144B, FIG. 1C) comprises a plurality of ports adapted to couple the node 208.1 to one or more clients 204.1/204.N over point-to-point links, wide area networks, virtual private networks implemented over a public network (Internet) or a shared local area network. The network adapter 410 thus may comprise the mechanical, electrical and signaling circuitry needed to connect the node to the network for executing RDMA operations. Each client 204.1/204.N may communicate with the node over network 206 (FIG. 2A) by exchanging discrete frames or packets of data according to pre-defined protocols, such as TCP/IP.

The storage adapter 416 cooperates with the storage operating system 134 executing on the node 208.1 to access information requested by the clients. The information may be stored on any type of attached array of writable storage device media such as hard drives, solid state drives, storage class memory, video tape, optical, DVD, magnetic tape, bubble memory, electronic random-access memory, micro-electromechanical and any other storage media adapted to store information, including data and parity information. However, as illustratively described herein, the information is preferably stored at storage device 118.1. The storage adapter 416 comprises a plurality of ports having input/output (I/O) interface circuitry that couples to the storage devices over an I/O interconnect arrangement, such as a conventional high-performance, Fibre Channel link topology.

Figure 4:
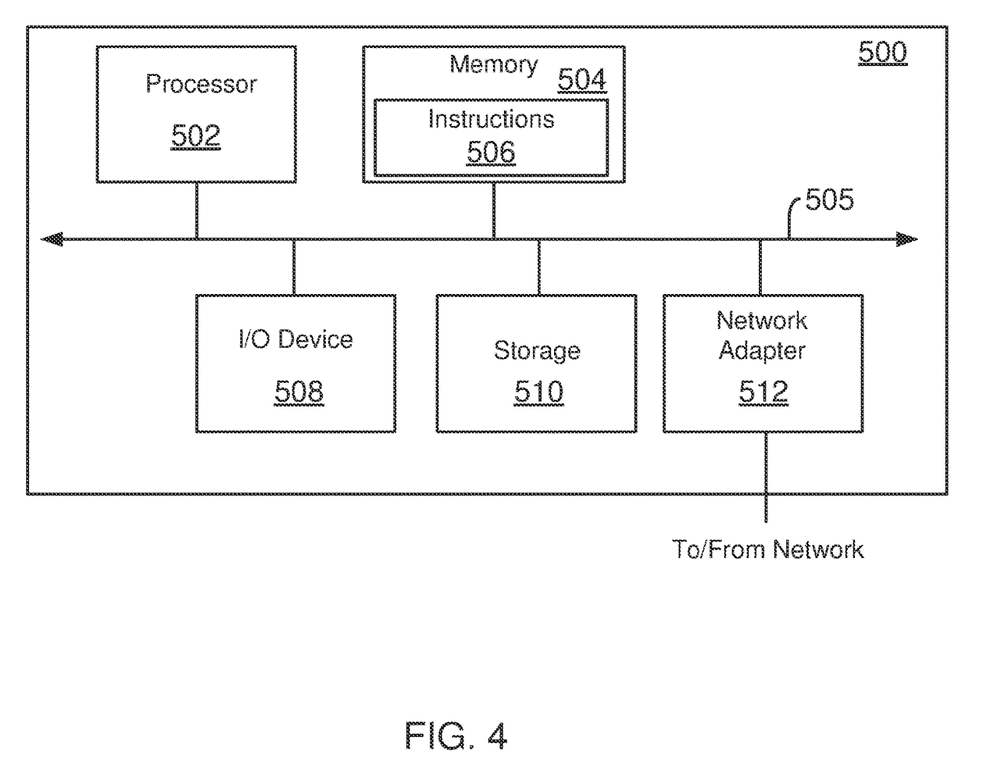
FIG. 4 shows an example of a processing system, used according to various aspects of the present disclosure.

Processing System: FIG. 4 is a high-level block diagram showing an example of the architecture of a processing system 500 that may be used according to one aspect. The processing system 500 can represent storage system node 108, host system 102, management console 132, or clients 116, 204. Note that certain standard and well-known components which are not germane to the present aspects are not shown in FIG. 4.

The processing system 500 includes one or more processor(s) 502 and memory 504, coupled to a bus system 505. The bus system 505 shown in FIG. 4 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. The processors 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to implement the RDMA layer 120, and the process steps of FIG. 1A described above, may reside in and executed (by processors 502) from memory 504.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, solid state drives, or any other storage media. The network adapter 512 provides the processing system 500 with the ability to communicate with remote devices (e.g., storage servers) over a network and may be, for example, an RDMA adapter, Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for efficiently handling missing network packets have been described. Note that references throughout this specification to "one aspect" (or "embodiment") or "an aspect" mean that a particular feature, structure, or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

tracking, by a remote direct memory access (RDMA) layer of a second node, an offset value in a header of each data packet from among a plurality of data packets received from a first node for a transaction identified by a transaction identifier, each data packet having a portion of a payload, and the offset value indicating a position of each portion within the payload, wherein the header includes a payload size and the transaction identifier;

based on the tracking, detecting, by the second node, a missing data packet from among the plurality of data packets;

transmitting, by the second node, a message to the first node indicating an offset value of a missing payload of the missing data packet; and receiving, by the second node, missing payload of the missing data packet and any other data packet with an offset value that occurs after the offset value of the missing payload resent by the first node without tracking individual data packet serial numbers;

wherein the first node tracks data packet transmission using the transaction identifier, the offset value of each data packet and the payload size, and in response to receiving the message, identifies any data packet with the offset value that occurs after the offset value of the missing payload of the missing data packet.

2. The method of claim 1, further comprising:
negotiating, by the first node and the second node, a maximum transmission unit ("MTU") size for communication between the first node and second node; and
splitting, by the first node, the payload into the plurality of data packets, based on the MTU size.

3. The method of claim 1, further comprising:
updating, by the first node, a transmit data structure to store the transaction identifier, the offset value of each transmitted data packet and the payload size; and
utilizing, by the first node, the transmit data structure to identify any data packet with the offset value that occurs after the offset value of the missing payload of the missing data packet.

4. The method of claim 1, further comprising:
storing, by the second node, in a receive data structure the transaction identifier, the total payload size and an offset value of each received data packet, and the second node uses the receive data structure to detect the missing data packet.

5. The method of claim 3, further comprising:
in response to receiving the message, using the transmit data structure by the first node for selectively rebuilding data packets with the offset value that occur after the offset value of the missing payload.

6. The method of claim 1, wherein the message from the second node to the first node is a non-acknowledgement ("NACK") packet.

7. The method of claim 1, further comprising:
forwarding, by a network interface of the second node data packets received by the network interface from the first node to the RDMA layer.

8. A non-transitory, machine-readable storage medium having stored thereon instructions for performing a method, comprising machine executable code which when executed by at least one machine, causes the at least one machine to:
track, by a remote direct memory access (RDMA) layer of a second node, an offset value in a header of each data packet from among a plurality of data packets received from a first node for a transaction identified by a transaction identifier, each data packet having a portion of a payload, and the offset value indicating a position of each portion within the payload, wherein the header includes a payload size and the transaction identifier;
based on the tracking, detect, by the second node, a missing data packet from among the plurality of data packets;
transmit, by the second node, a message to the first node indicating an offset value of a missing payload of the missing data packet; and
receive, by the second node, missing payload of the missing data packet and any other data packet with an offset value that occurs after the offset value of the missing payload resent by the first node without tracking individual data packet serial numbers;
wherein the first node tracks data packet transmission using the transaction identifier, the offset value of each data packet and the payload size, and in response to receiving the message, identifies any data packet with the offset value that occurs after the offset value of the missing payload of the missing data packet.

9. The non-transitory, machine-readable storage medium of claim 8, wherein the machine executable code which when executed by the at least one machine, further causes the at least one machine to:
negotiate, by the first node and the second node, a maximum transmission unit ("MTU") size for communication between the first node and second node; and
split, by the first node, the payload into the plurality of data packets, based on the MTU size.

10. The non-transitory, machine-readable storage medium of claim 8, wherein the machine executable code which when executed by the at least one machine, further causes the at least one machine to:
update, by the first node, a transmit data structure to store the transaction identifier, the offset value of each transmitted data packet and the payload size; and
utilize, by the first node, the transmit data structure to identify any data packet with the offset value that occurs after the offset value of the missing payload of the missing data packet.

11. The non-transitory, machine-readable storage medium of claim 8, wherein the machine executable code which when executed by the at least one machine, further causes the at least one machine to:
store, by the second node, in a receive data structure the transaction identifier, the total payload size and an offset value of each received data packet, and the second node uses the receive data structure to detect the missing data packet.

12. The non-transitory, machine-readable storage medium of claim 10, wherein the machine executable code which when executed by the at least one machine, further causes the at least one machine to:
in response to receiving the message, use the transmit data structure by the first node for selectively rebuilding data packets with the offset value that occur after the offset value of the missing payload.

13. The non-transitory, machine-readable storage medium of claim 8, wherein the message from the second node to the first node is a non-acknowledgement ("NACK") packet.

14. The non-transitory, machine-readable storage medium of claim 8, wherein the machine executable code which when executed by the at least one machine, further causes the at least one machine to:
forward, by a network interface of the second node data packets received by the network interface from the first node to the RDMA layer.

15. A system, comprising:
a memory containing non-transitory machine readable storage medium comprising machine executable code having stored thereon instructions; and
a processor of a first node coupled to the memory, the first node communicating with a second node via a network connection, the processor configured to execute the machine executable code to:
track, by a remote direct memory access (RDMA) layer of a second node, an offset value in a header of each data packet from among a plurality of data packets received from a first node for a transaction identified by a transaction identifier, each data packet having a portion of a payload, and the offset value indicating a position of each portion within the payload, wherein the header includes a payload size and the transaction identifier;
based on the tracking, detect, by the second node, a missing data packet from among the plurality of data packets;
transmit, by the second node, a message to the first node indicating an offset value of a missing payload of the missing data packet; and
receive, by the second node, missing payload of the missing data packet and any other data packet with an offset value that occurs after the offset value of the missing payload resent by the first node without tracking individual data packet serial numbers;

wherein the first node tracks data packet transmission using the transaction identifier, the offset value of each data packet and the payload size, and in response to receiving the message, identifies any data packet with the offset value that occurs after the offset value of the missing payload of the missing data packet.

16. The system of claim 15, wherein the machine executable code further causes to:

negotiate, by the first node and the second node, a maximum transmission unit ("MTU") size for communication between the first node and second node; and split, by the first node, the payload into the plurality of data packets, based on the MTU size.

17. The system of claim 15, wherein the machine executable code further causes to:

update, by the first node, a transmit data structure to store the transaction identifier, the offset value of each transmitted data packet and the payload size; and utilize, by the first node, the transmit data structure to identify any data packet with the offset value that occurs after the offset value of the missing payload of the missing data packet.

18. The system of claim 15, wherein the machine executable code further causes to:

store, by the second node, in a receive data structure the transaction identifier, the total payload size and an offset value of each received data packet, and the second node uses the receive data structure to detect the missing data packet.

19. The system of claim 17, wherein the machine executable code further causes to:

in response to receiving the message, use the transmit data structure by the first node for selectively rebuilding data packets with the offset value that occur after the offset value of the missing payload.

20. The system of claim 15, wherein the message from the second node to the first node is a non-acknowledgement ("NACK") packet.

* * * * *